United States Patent [19]

Reffelt

[11] Patent Number: 4,564,793

[45] Date of Patent: Jan. 14, 1986

[54] BRUSHLESS DC MOTOR WITH IMPROVED STARTING

[75] Inventor: James Reffelt, Shokan, N.Y.

[73] Assignee: Rotron, Incorporated, Woodstock, N.Y.

[21] Appl. No.: 536,885

[22] Filed: Sep. 28, 1983

[51] Int. Cl.[4] .......................................... H02K 37/00
[52] U.S. Cl. ..................................... 318/254; 318/138; 310/46
[58] Field of Search ............... 310/46, 49, 216–218, 310/268, 267, 68 R, 68 B–68 D; 318/138, 254, 254 A

[56] References Cited

U.S. PATENT DOCUMENTS

| | | |
|---|---|---|
| 1,996,195 | 4/1935 | Ferguson . |
| 2,472,039 | 5/1949 | Zacharias ........................ 310/46 X |
| 2,601,517 | 6/1952 | Hammes . |
| 2,697,986 | 12/1954 | Meagher . |
| 2,912,609 | 11/1959 | Kassner ........................ 310/267 X |
| 3,032,670 | 5/1962 | Fritz . |
| 3,083,314 | 3/1963 | Ratajski . |
| 3,098,958 | 7/1963 | Katz . |
| 3,230,434 | 1/1966 | Bauerlein . |
| 3,242,404 | 3/1966 | Favre . |
| 3,264,538 | 8/1966 | Brailsford . |
| 3,379,907 | 4/1968 | Hollinger . |
| 3,433,987 | 3/1969 | Thees . |
| 3,483,456 | 12/1969 | Brunner et al. . |
| 3,493,831 | 2/1970 | Roberts . |
| 3,577,049 | 5/1971 | Madurski et al. . |
| 3,626,263 | 12/1971 | McBride ........................ 310/49 X |
| 3,631,272 | 12/1971 | Kirii et al. . |
| 3,662,196 | 5/1972 | Ruschmann . |
| 3,845,334 | 10/1974 | Harada et al. . |
| 3,873,897 | 3/1975 | Muller . |
| 3,891,905 | 6/1975 | Muller . |
| 3,909,647 | 9/1975 | Peterson ........................ 310/267 X |
| 3,961,211 | 6/1976 | Vergues ........................ 310/46 X |
| 4,130,769 | 12/1978 | Karube . |
| 4,164,690 | 8/1979 | Muller et al. . |
| 4,322,666 | 3/1982 | Müller . |
| 4,358,245 | 11/1982 | Gray . |
| 4,371,817 | 2/1983 | Müller . |
| 4,373,148 | 2/1983 | Gutz . |
| 4,459,087 | 7/1984 | Barge . |

FOREIGN PATENT DOCUMENTS 18904 11/1980 European Pat. Off. .
3026797 2/1982 Fed. Rep. of Germany .

OTHER PUBLICATIONS

Air Currents, vol. 2, No. 1, Rotron, Inc., Copyright 1977.
Rotron Drawings, M500246, M500247 and PC027648.
Rotron Photographs.
Michael Oppenheimer, "In IC Form, Hall–Effect Devices Can Take on Many New Applications", *Electronics*, Aug. 2, 1971, pp. 46–49.
Jearl Walker, "The Amateur Scientist", *Scientific American*, Mar. 1982, pp. 142–152.

*Primary Examiner*—Donovan F. Duggan
*Attorney, Agent, or Firm*—Brumbaugh, Graves, Donohue & Raymond

[57] ABSTRACT

A brushless DC motor of the kind that includes a relatively large rotor permanent magnet magnetized radially in segments around its circumference to provide alternate segments oppositely magnetized has a stator magnetic structure with two dissimilar pole pieces in flux conducting relation to a pair of windings. A first of the pole pieces presents a face to the outer surface of the annular magnet across an air gap. A second pole piece, which may be somewhat further from the outer surface of the annular magnet, at the opposite end of the windings, presents only a narrow edge surface facing generally in the direction of the magnet. The modified pole piece is L-shaped or U-shaped, having one or two legs respectively, projecting from the coil support structure generally circumferentially with respect to the magnet. The legs taper towards their ends more remote from the coil support structure and form broader upper and lower surfaces more nearly perpendicular the axis of magnet rotation than the narrow edge surface or surfaces facing the magnet across the air gap.

12 Claims, 8 Drawing Figures

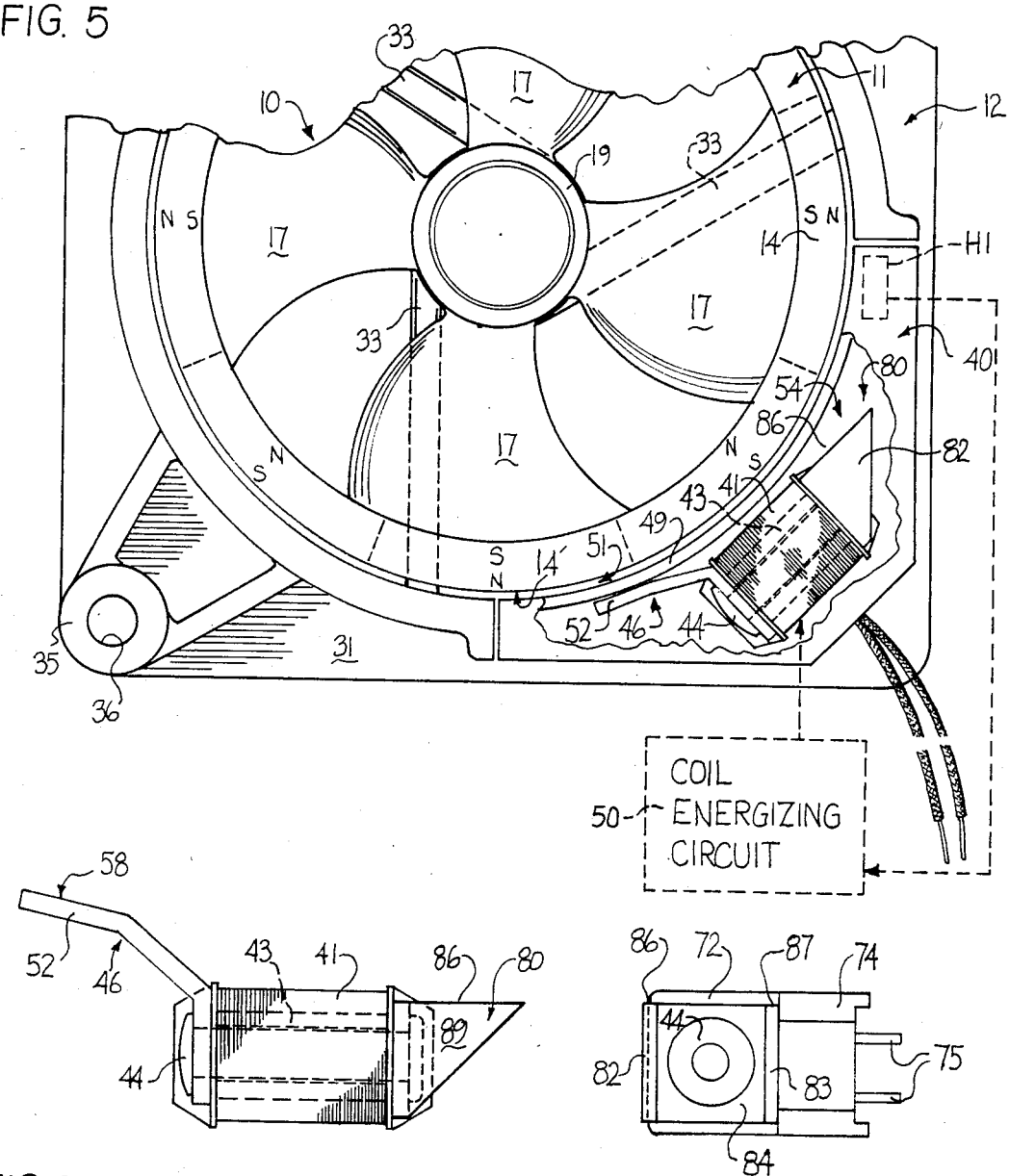
FIG. 5
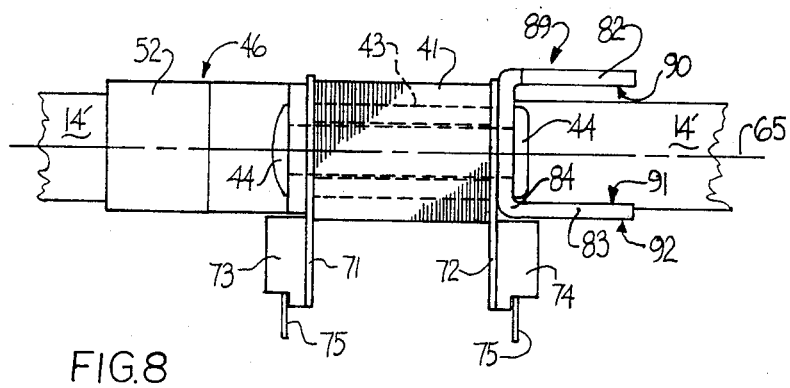
FIG. 6
FIG. 7
FIG. 8

BRUSHLESS DC MOTOR WITH IMPROVED STARTING

BACKGROUND OF THE INVENTION

This invention relates to brushless DC motors with improved starting and more particularly to a brushless DC motor with an annular permanent magnet, stator windings at one location along the outer circumference of the magnet, and two dissimilar pole shoes or pole pieces to assure starting without cogging.

U.S. patent applications Ser. No. 416,504 of Deavers and Reffelt, filed Sept. 10, 1982 and Ser. No. 520,154 of Brown and Grouse, filed Aug. 4, 1983, both assigned to the assignee of this invention and incorporated herein by reference, relate to a simple brushless DC motor particularly useful as an inexpensive fan motor. A relatively large annular rotor permanent magnet magnetized in segments is driven by stator provisions located outside the annular magnet at a location on its circumference. In fan applications, the fan blades are located radially inwardly of the annular magnet.

In the motor of the first application mentioned above, the annular magnet has radially magnetized segments spaced apart by unmagnetized segments. A winding on a bobbin has a pair of pole pieces connected in flux conducting relation to it, the pole pieces extending from the ends of the bobbin to correctly placed locations near the outer surface of the annular magnet to attract the magnetic segments of the magnet with each energization of the winding. Commutation is by a Hall switch located near the outer circumference of the annular magnet and responsive to the magnetized segments to energize the winding at appropriate points in the travel of the annular rotor magnet. The winding is left unenergized during portions of the travel of the magnet. When the motor is turned off, there is, absent starting provisions, a likelihood that the magnet will come to rest in a position, in which, upon startup, the Hall switch will not energize the winding and no rotary movement will result. To overcome this, a rather large permanent detent magnet segment is located to attract a permanent magnet segment and assure that the annular rotor magnet comes to rest correctly with each shutdown of the motor. However, the force of this detent magnet lying just outside the circumference of the annular magnet contributes to vibration of the motor.

In the second of the above-mentioned U.S. patent applications, a motor with a similar layout employs an annular rotor magnet permanently magnetized at alternate segments oppositely radially magnetized. A pair of coils are wound onto the bobbin in bifilar fashion and are alternately energized to create, via pole pieces proximate the annular rotor magnet, a reversing electromagnetic field. Consequently there are no rather large dead spots in the operation of the motor, but still the possibility of cogging exists, just as in any permanent magnet DC motor. Experimentally, a piece of unmagnetized magnetic material located near the outer circumference of the annular magnet was positioned to attract the nearest permanent magnet segment and draw the rotor to rest at a position angularly offset from a cog position in the event that the rotor was about to come to rest at the cog position. Location of the piece of magnetic material, typically a steel pin, proved sufficient to assure start-up in experimental units. In production, however, cogging proved more prevalent than expected with this arrangement. Hence, it became necessary to develop an anti-cogging arrangement to assure that the motor would consistently start even when manufactured under ordinary production conditions.

Anti-cogging arrangements are known in the art, these include modification of pole faces to bring one location of a stator pole face closer a rotor magnet across the air gap than another location on the same pole face. In motors like those to which this invention applies, modification of one pole piece to reduce its area opposite the outer surface of the annular magnet was tried, for example by shortening the end of one pole piece where it was closely proximate the rotor magnet. Unsatisfactory results were achieved even when it was expected that such modification should result in consistent starting. Only a very radical modification of one pole resulted in consistent starting of production motors.

BRIEF SUMMARY OF THE INVENTION

In accordance with this invention there is provided a brushless DC motor of the kind having an annular rotor magnet radially magnetized in segments and stator provisions proximate the outside circumference of the magnet including two pole pieces in flux conducting relationship with stator coil windings, the pole pieces having substantially different configurations and relationships to the outer surface of the annular rotor magnet.

Like the pole pieces of the aforementioned U.S. applications Ser. Nos. 416,504 and 520,154, one of the pole pieces of the motor according to this invention extends from the bobbin of the coil windings to proximate the outer surface of the annular magnet and presents a rectangular surface facing the outer magnet surface. The remaining pole piece, however, presents only a narrow edge across the air gap at its location. In one embodiment, the modified pole piece is L-shaped when viewed across the air gap. One leg of the L is secured in flux conducting relation to the windings. The other leg of the L extends generally circumferentially of the magnet. This leg has a broader face facing more nearly parallel to the direction of the axis of rotor rotation and a narrow edge generally facing the annular magnet. The broader face tapers as it proceeds away from the windings and the secured leg of the L. The distance from the outer surface of the annular magnet to the generally circumferentially extending leg may be somewhat greater than the air gap defined between the magnet and the other pole piece. The generally circumferentially extending leg of the L may be inclined slightly towards the motor to reduce the axial component of the force that it applies to the permanent magnet in attracting the segments. In other words, the face of the L-shaped pole piece does not face the outer surface of the annular rotor magnet as might be expected, but looks more in the axial direction with only, at most, a slight inclination towards the magnet. Neither does the modified L-shaped pole piece extend away from the bobbin and windings in the manner of the remaining pole piece, as had been the case with the pole pieces of the motors of the earlier applications, mentioned above. Rather, this extremely different pole piece is fastened closely proximate the bobbin and windings.

In a preferred embodiment that more nearly eliminates or substantially reduces axial loading on the annular magnet at the modified pole piece, the modified piece is U-shaped, viewed across the air gap. The legs or arms of the U extend generally circumferentially of the magnet and are spaced apart in a direction parallel to the axis of rotation of the rotor magnet. The base of the U is secured to the bobbin and windings in flux-conducting relationship thereto. Each leg of the U has a broader face facing generally in the axial direction and tapering or narrowing in its direction away from the base of the U. Edge surfaces of the legs of the U face across the air gap towards the magnet. The axial components of the magnetic attraction of the magnet to the legs are opposite in direction, so that little or no resultant axial force acts on the magnet at this location. This embodiment is improved over the foregoing L-shaped embodiment in that the single leg of the L, located to one side of the magnet width, will result in an axial component of attraction between that leg and the magnet even with the aforementioned inclination of the generally circumferentially extending arm of the L. In the U-shaped pole piece, as in the L-shaped pole piece, the spacing from the pole piece to the outer surface of the annular magnet is greater than in the remaining, unaltered pole piece, the U-shaped pole piece is located immediately adjacent the bobbin and windings and the area that it presents to the surface of the annular magnet is greatly reduced with respect to the rectangular surface of the remaining pole piece closely proximate the magnet outer surface.

By virtue of the foregoing radical revisions of one pole piece of motors according to the invention, consistent starting in production units has been accomplished, whereas prior attempts to revise the piece have failed to provide the desired results, contrary to what was expected. The above and further benefits and advantages of the invention will be better understood with reference to the accompanying drawings taken in consideration with the following.

DESCRIPTION OF THE DRAWINGS

In the drawings:

FIG. 5 is a fragmentary top plan view of a fan and motor according to the invention, and shows the annular permanent magnet in relationship to a further embodiment of electromagnetic stator structure with differing pole pieces;

FIG. 6 is an enlarged top plan view of the stator structure of FIG. 5;

FIG.7 is a side elevational view of the structure of FIG. 6; and

FIG. 8 is a front elevational view of the structure of FIG. 6.

DETAILED DESCRIPTION OF PREFERRED EMBODIMENTS

Figure 1:
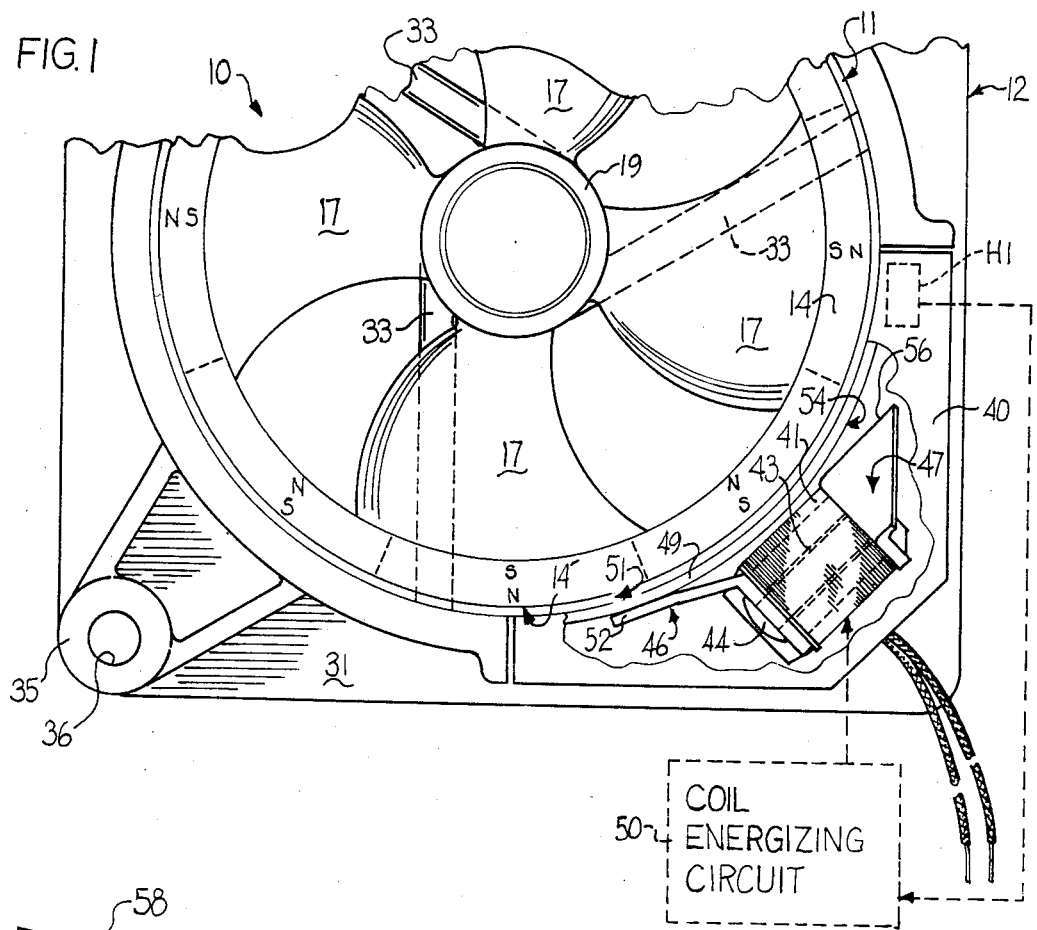
FIG. 1 is a fragmentary top plan view of a fan and motor according to the invention, with parts broken away for clarity, and shows the rotor's annular permanent magnet in relation to external electromagnetic stator structure with dissimilar pole pieces.

In FIG. 1, a fan and motor combination 10 has a rotor 11 and a stator 12. The rotor 11 has an annular permanent magnet 14, magnetized in segments about its circumference. Each succeeding segment about the circumference is oppositely magnetized in the radial direction, as shown. The magnet 14 is secured to fan blades 17 affixed inwardly to a central hub 19. Securing of the magnet 14 to the blades 17 may be as illustrated in the aforementioned U.S. patent application Ser. No. 520,154 and the hub 19 may mount the blades and magnet for rotation in the manner of the bearing provisions of that application. Three struts 33 can be seen connecting to and extending inward from a stator housing 31 to a fixed central portion of that housing below the hub 19. Mounting bosses 35, only one of which is shown in FIG. 1, define holes 36 about the periphery of the housing, enabling the motor and fan to be mounted.

The housing 31 forms a compartment 40 containing a stator coil 41 comprising two electrically independent windings wound in bifilar fashion on a bobbin 43. At one end of the bobbin 43, a first pole piece 46 is secured by a rivet 44 of magnetic material flux conducting relation to the coil 41. At the other end of the bobbin 43 a second, modified pole piece 47 is secured by the swaged-over end of the rivet 44. This electromagnet structure is more clearly illustrated in FIGS. 2–4.

Also indicated in FIG. 1, a Hall switch H1 senses the position of the annular rotor magnet 14 for commutation purposes, controlling a coil energizing circuit 50. Again, the circuit 50 may be as illustrated and described in the aforementioned U.S. patent application Ser. No. 520,154 and is actually located in the compartment 40. The circuit alternately energizes the two independent windings of the coil 41 to alternately attract segments of the magnet 14.

An end portion 52 of the pole piece 46 lies proximate or against a wall 49 of the compartment 40. It will be noted that an air gap 51 defined between the end portion 52 of the pole piece 46 and an outer surface 14' of the magnet 14 is narrower than an air gap 54 defined between the outer surface of the magnet and an edge 56 of the pole piece 47. Whereas the end 52 of the pole piece 46 extends nearly parallel to a tangent of the magnet 14, closely proximate the outer surface thereof, the pole piece 47 extends only generally circumferentially at a greater distance from the surface. As used herein, "generally circumferentially" means that, for example as shown in FIG. 1, and again in FIG. 5, the pole piece may be somewhat angularly disposed with respect to a line tangent to the outer surface of the magnet at the location of the pole piece, but does extend more in the circumferential direction than radially with respect to the magnet.

Figure 2:
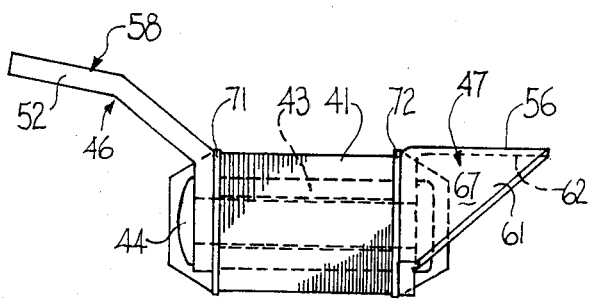
FIG. 2 an enlarged top plan view of the stator structure of FIG. 1.
Figure 3:
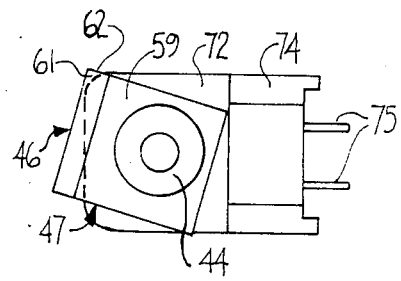
FIG. 3 is a side plan view of the structure of FIG. 2 and shows the inclination of an L-shaped pole piece.
Figure 4:
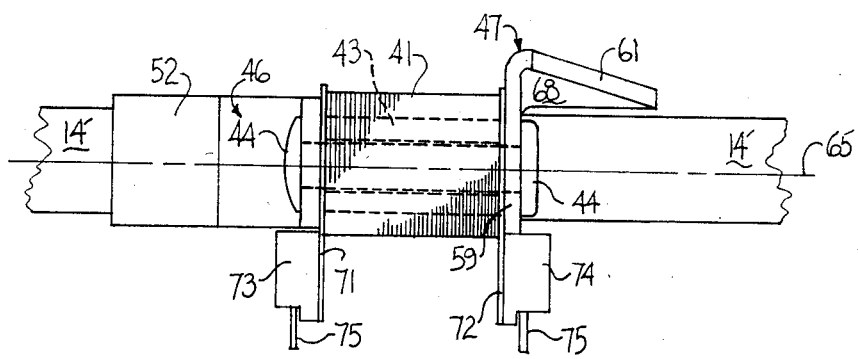
FIG. 4 a front elevational view of the stator structure of FIG. 2 and shows the windings and pole pieces adapted for connection to, for example, a printed circuit board.

As seen in FIGS. 2–4, the pole piece 46 is like its counterpart in the aforementioned U.S. applications. The end portion 52 defines a flat rectangular surface 58 slightly wider, which is to say larger in the axial direction, than the annular magnet 14 whose outer surface 14' can be seen in FIG. 4 in relation to the two pole pieces. The pole piece 47, on the other hand, is L-shaped when viewed across the air gap 54. One leg 59 of the L-shape is secured by the swaged-over end of the rivet 44. The other leg 61 of the L projects away from the bobbin and windings in the direction described herein as generally circumferentially with respect to the magnet 14. Only the surface 62 of the edge 56 of the leg 61 faces the magnet 14 across the air gap 54. Thus, the pole piece 47 presents a substantially reduced area facing the magnet. Furthermore, as FIG. 4 shows, the edge surface 62 facing the magnet is considerably offset from the central plane 65 of the magnet 14, perpendicular to the axis of rotation of the magnet. The leg 61 is much closer to the forward surface of the magnet than to the rearward surface.

The leg 61 narrows or tapers as it proceeds away from the coil 41. Thus the leg 61 has a generally triangular shape with corresponding triangular upper and lower faces 67 and 68. As can be seen from FIGS. 3 and 4, the leg 46 is slightly inclined towards the magnet 14. This somewhat reduces the axial component of the attraction between the pole piece and the magnet.

Other features of the electromagnet structure include plastic bobbin ends 71 and 72 and mounting blocks 73 and 74, respectively. Connecting pins 75 are connected to the ends of the two windings making up the coil 41 and are connected into a printed circuit board housed in a cavity 40 and carrying the circuit 50.

In FIGS. 5-8, like numerals identify like parts. With the exception of a modified pole piece 80, the parts shown are identical to those shown and described with respect to FIGS. 1-4. The Hall switch H1 and the energizing circuit 50 are, again, preferably connected as described in the preceding U.S. patent application Ser. No. 520,154. Again the air gap 54, between the pole piece 80 and the magnet 14, may be larger than the air gap 51.

In the embodiment of FIGS. 5-8, the pole piece 80 is generally U-shaped when viewed across the air gap 54. An upper leg 82 and a lower leg 83 form the arms of the U and a mounting section 84 forms the base. The swaged end of the rivet 44 secures the base 84 to the coil 41 and bobbin 43. Edges 86 and 87 of the arms 82 and 83 face generally in the direction of the magnet 14 across the air gap 54, so again the area of the pole piece facing the magnet is significantly less than the area of the surface 58 of the pole piece 46 facing the magnet across the narrower gap 51. Each of the arms 82 and 83 tapers or narrows as it proceeds outward away from the coil 41 to define generally triangular upper and lower surface areas 89, 90, 91, and 92.

Returning to FIG. 4, it will be seen that, even though it is inclined as mentioned above, by virtue of its being to one side of the central plane 65 of the magnet 14, the arm 61 of the L-shaped pole piece 47 will create a substantial force component parallel the axis of the rotor on the rotor magnet 14 each time the coil 41 is energized to create a magnetic field attracting the approaching magnet segment. It will be appreciated that such a force may tend to cause wobble with repeated energization of the coil and unwanted bearing loading. To a large extent, the two arms 82 and 83 of the pole piece 80 of FIGS. 5-8 overcome the axial force component that a single offset arm produces. The arms 82 and 83 straddle the central plane 65 of the magnet 14, so that while the one arm 82 may attract the magnet 14 with an axial component upward, the arm 83 will attract the magnet with a force having a downward component. In this manner, the resultant axial force may be quite substantially reduced or eliminated.

The modified pole structure described above has resulted in consistent starting in production motors and is relatively easy to make and assemble, so as not to contribute substantial expense to the manufacture of this motor. Whereas preferred embodiments of the improved starting features have been described above, it will be readily understood that variations may be made without departure from the inventive concepts as defined in the appended claims.

What is claimed is:

1. A DC motor comprising:
    a rotor with an annular permanent magnet defining magnetic segments oppositely polarized in the radial outward direction, wherein said segments are arranged circumferentially about the magnet;
    a stator having electromagnet structure outside said annular magnet, said structure including coil means for establishing magnetic fields of opposite polarities to attract the oppositely polarized segments of and for applying continuous rotational torque to the annular magnet;
    position detecting means for detecting the position of the rotor relative to the stator and for commutating electrical current to the coil means to repeatedly produce said opposite polarity fields and attract said segments in dependence on said relative positioning;
    the electromagnet structure including a pair of pole pieces in flux conducting relation to the coil means;
    a first of said pole pieces having a position with a face thereof facing an outer circumferential surface of the permanent magnet across a first air gap defined between the face and the permanent magnet; and
    a second of said pole pieces having an edge surface thereof facing generally towards the outer circumferential surface across a second air gap defined between the edge surface and the permanent magnet;
    the first pole piece that faces the permanent magnet outer face circumference being broader in the axial direction than the edge of the second pole piece that faces generally towards the outer circumferential surface.

2. The motor according to claim 1 wherein the air gap distance from the first pole piece to the magnet is less than the air gap distance from the second pole piece to the magnet.

3. The motor according to claim 1 wherein the second pole piece has a portion thereof affixed to a coil means support structure and at least one leg extending generally circumferentially with respect to the outer circumferential surface of the permanent magnet.

4. A DC motor comprising:
    a rotor with an annular permanent magnet defining magnetic segments oppositely polarized in the radial outward direction, wherein said segments are arranged circumferentially about the magnet;
    a stator having an electromagnet structure outside said annular magnet, said structure including coil means for establishing magnetic fields of opposite polarities to attract the oppositely polarized segments of and for applying continuous rotational torque to the annular magnet;
    position detecting means for detecting the position of the rotor relative to the stator and for commutating electrical current to the coil means to repeatedly produce said opposite polarity fields and attract said segments in dependence on said relative positioning;
    the electromagnet structure including a pair of pole pieces in flux conducting relation to the coil means;
    a first of said pole pieces having a position with a face thereof facing an outer circumferential surface of the permanent magnet across a first air gap defined between the face and the permanent magnet; and
    a second of said pole pieces having an edge surface thereof facing generally towards the outer circumferential surface across a second air gap defined between the edge surface and the permanent magnet;

the first pole piece that faces the permanent magnet outer face circumference being broader in the axial direction than the edge of the second pole piece that faces generally towards the outer circumferential surface;

the second pole piece having a portion thereof affixed to a coil means support structure and at least one leg extending generally circumferentially with respect to the outer circumferential surface of the permanent magnet;

the leg of the second pole piece having one edge thereof defining said edge surface and generally facing the magnet location across the second air gap, said one edge being substantially narrower than the thickness of the permanent magnet measured in the direction of the axis of the rotor and being substantially narrower in the direction of the rotor axis than the surface area of the face of the first pole piece.

5. The motor according to claim 4 wherein said permanent magnet has forward and rearward faces in the rotor axis direction and said one edge of the second pole piece is closer to one of the forward and rearward faces than to the other.

6. The motor according to claim 3 wherein the leg extending generally circumferentially has a face that narrows towards its end remote from the support structure, has an edge surface generally facing the permanent magnet, the edge surface having substantially less surface area than said face that narrows, and said face that narrows lying in a plane more nearly perpendicular to the rotor axis than said edge surface.

7. The motor according to claim 6 wherein the second pole piece is generally L-shaped, viewed across the air gap, and said narrowing face is inclined with respect to a plane perpendicular to the axis of the rotor.

8. The motor according to claim 3 wherein the second pole piece is U-shaped and has two legs extending generally circumferentially with respect to the outer circumferential surface of the permanent magnet, said portion affixed to the support structure connecting the legs and forming the base of the U-shape.

9. The motor according to claim 8, wherein said permanent magnet has forward and rearward surfaces in the rotor axis direction and one leg of the U-shaped second pole piece is closer to one of the forward and rearward surfaces and the other leg is closer to the other of the forward and rearward surfaces.

10. The motor according to claim 9, wherein each leg of the second pole piece has edge surfaces facing generally in the direction of the permanent magnet and broader surfaces facing more nearly perpendicular to the axis of rotor rotation, and said broader surfaces become narrower as they proceed away from the base of the U-shape.

11. A DC motor comprising:
a rotor with an annular permanent magnet defining magnetic segments oppositely polarized in the radial outward direction, wherein said segments are arranged circumferentially about the magnet;

a stator having an electromagnet structure outside said annular magnet, said structure including coil means for establishing magnetic fields of opposite polarities to attract the oppositely polarized segments of the annular magnet;

position detecting means for detecting the position of the rotor relative to the stator and for commutating electrical current to the coil means to repeatedly produce said opposite polarity fields and attract said segments in dependence on said relative positioning;

the electromagnet structure including a pair of pole pieces in flux conducting relation to the coil means;

a first of said pole pieces having a position with a surface proximate the permanent magnet and facing an outer circumferential surface of the permanent magnet across a first air gap;

a second of said pole pieces having a mounting portion and at least one leg projecting therefrom; and said leg having broad upper and lower surfaces tapering to a narrower dimension in the direction away from the mounting portion, and the leg having a narrow surface area generally facing across a second air gap towards the permanent magnet.

12. The motor according to claim 11 wherein the second pole piece is generally U-shaped when viewed across the air gap, the mounting portion forming the base of the U-shape, the at least one leg forming one arm of the U-shape and a further leg forming the other arm of the U-shape, the further leg having broad upper and lower surfaces tapering to a narrower dimension in the direction away from the mounting portion, and the further leg having a narrow surface area generally facing across the air gap towards the permanent magnet, said legs being located such that a central plane of the permanent magnet between forward and rearward faces thereof and perpendicular to the axis of rotation of the rotor lies between the two legs.

* * * * *